Patented Nov. 25, 1952

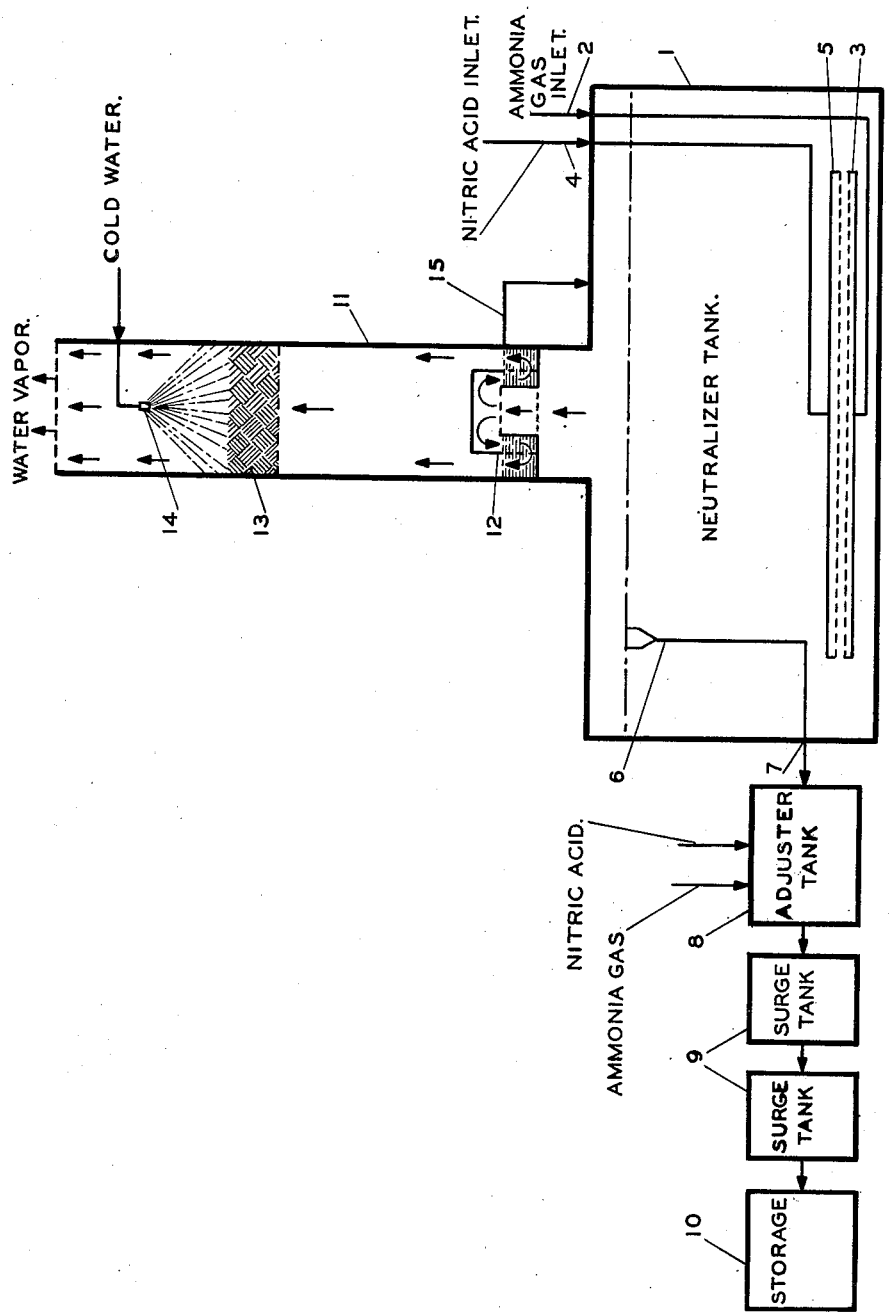
JOHN E. GREER.
ROBERT W. LAWRENCE.
INVENTORS.
BY Ernest G. Peterson
AGENT.

2,619,405

UNITED STATES PATENT OFFICE 2,619,405

PROCESS FOR MANUFACTURE OF
AMMONIUM NITRATE

John E. Greer, Radford, Va., and Robert W. Lawrence, Wilmington, Del., assignors to Hercules Powder Company, Wilmington, Del., a corporation of Delaware Application July 10, 1948, Serial No. 38,024

7 Claims. (Cl. 23—103)

This invention relates to the manufacture of ammonium nitrate and more particularly to a continuous process for the manufacture of ammonium nitrate wherein losses of nitrogenous substances are substantially eliminated.

Most of the processes used in the production of ammonium nitrate are usually commercial adaptations of the basic neutralization reaction between ammonium hydroxide and nitric acid. According to the usual continuous commercial process, aqueous nitric acid and ammonia gas are fed continuously into a tank precharged with ammonium nitrate solution at a predetermined concentration and from which there is a continuous overflow of substantially neutralized solution of ammonium nitrate. Complete neutralization of the overflow is then accomplished in a series of surge tanks prior to storing the ammonium nitrate solution. Alternatively, if an ammonium nitrate solution is not available, the process may be initiated by covering the spargers in the neutralizer tank with nitric acid of the desired strength and then admitting ammonia to neutralize the acid.

Since the neutralization reaction is exothermic in nature and sufficient heat is developed to maintain the ammonium nitrate solution in the neutralizer tank at its boiling point, a considerable quantity of water is evaporated into the atmosphere. Because of the elevated temperature, the agitation caused by the spargers and the boiling of the solution, considerable quantities of nitrogen-containing materials also leave the solution and pass out the neutralizer tank exhaust stack with the water vapor. The stack gases, therefore, consist of superheated water vapor, vaporized nitric acid and ammonia in equilibrium, entrained droplets of ammonium nitrate solution, and a small portion of inert gases such as nitrogen and oxygen. Neither of these inert substances is evolved in the neutralization reaction, but instead is traceable to the acid feed. The oxygen and most of the nitrogen come from entrained air in the nitric acid feed while part of the nitrogen is set free by the reaction of traces of oxides of nitrogen dissolved in the acid feed as follows:

$$2NO_2 + NH_4NO_3 \rightarrow N_2 + 2HNO_3 + H_2O$$

The quantities of these substances which are lost of course depend on the conditions of reaction, i. e., the higher the temperature, the greater the rate of feed, and the more vigorous the agitation, the greater the amount of loss. The proportions in which the specific substances are lost from solution depend on the pH maintained. As the acidity of the solution is increased, the amount of acid vapor and entrained ammonium nitrate increases while the amount of ammonia vapor decreases. If the neutralizer tank liquid is kept on the basic side, and the alkalinity increased, substantial ammonium nitrate entrainment still takes place but there is an increase in the amount of ammonia vapor and a decrease in the amount of nitric acid vapor as the pH rises. However, it has been found that for given reaction conditions, minimum losses of nitrogenous materials are encountered when the reaction solution is kept slightly on the acid side, that is, when the solution contains from about 0.1% to 0.5% free nitric acid.

In the production of ammonium nitrate solutions, it is highly desirable to allow the heat of reaction to vaporize large amounts of water into the atmosphere through the neutralizer stack. This is especially true when concentrated ammonium nitrate solutions are desired. If the water vapor is permitted to escape, however, the vaporized and entrained nitrogenous substances also escape. As a result, there is a substantial economic loss, discomfort to personnel, corrosion of surrounding objects and a fire hazard due to deposition of ammonium nitrate on nearby inflammable structures. Consequently, many attempts have been made to discover an effective means of recovering these escaping nitrogenous substances. However, none of the methods developed by the art have proved satisfactory from the combined standpoint of efficiency and economy, especially when applied to the production of concentrated solutions.

It is therefore the object of the present invention to present a highly efficient, economical process for the production of ammonium nitrate which substantially eliminates loss of nitrogenous substances.

It is a further object of the invention to present a process for the production of concentrated ammonium nitrate solutions whereby escaping nitrogenous substances may be recovered without causing any substantial dilution of the product.

Other objects of the invention will be apparent from the specification and appended claims.

Generally described, the present invention comprises reacting ammonia and nitric acid in a vessel equipped with a superimposed exhaust stack, refluxing within the stack not more than 15% of the exhaust gases, and utilizing the heat of reaction in the reaction vessel to concentrate the ammonium nitrate solution by vaporizing water therefrom. The solution of recovered nitrogenous substances may then be led back into the neutralizer tank, the amount of dilution being negligible.

Having generally described the invention a more detailed description thereof is given with reference to the accompanying drawing.

The figure of the drawing represents a diagrammatic showing of one form of apparatus for the embodiment of the present invention.

A neutralizer tank 1 is equipped with an ammonia gas inlet 2 and sparger 3, a nitric acid inlet 4 and sparger 5, an overflow standpipe 6 and an outlet 7 leading to an adjuster tank 8, a surge tank 9 and a storage tank 10. The neutralizer tank 1 is provided with a stack 11 containing a bubble cap assembly 12, a packed portion 13, and a spray nozzle 14 connected to a source of water.

According to the invention, the process is initiated by charging the neutralizer tank 1 with an amount of ammonium nitrate solution of desired acidity or alkalinity sufficient to cover the spargers 3 and 5. Ammonia gas is then introduced through inlet 2 and distributed by sparger 3 and nitric acid is introduced through inlet 4 and distributed by sparger 5. The amount of these reactants is automatically regulated according to desired acidity or alkalinity. An exothermic reaction results and sufficient heat is generated to cause the solution in the tank to boil with a consequent evaporation of appreciable amounts of water. Mixed with this water vapor are substantial amounts of nitrogen-containing materials and, if oxides of nitrogen are entrained in the acid feed, a small amount of free nitrogen. These substances pass up stack 11 and would escape into the atmosphere if it were not for the refluxing means contained within said stack. However, prior to the admission of the reactants to the neutralzer tank 1, water is introduced through spray nozzle 14 and is allowed to rise to the desired level in the bubble cap assembly 12. As the gases escaping from the reaction zone bubble through the water in the bubble cap assembly 12, the gases are cooled and a major portion of the condensable substances is removed. Substantially the remainder of these substances is removed as the exhaust gases are scrubbed by the countercurrent flow of water through the packed portion 13. The entrained droplets of ammonium nitrate solution are removed by the combined action of the bubble cap plate, the packed portion, and the water spray. Consequently, if only enough water is sprayed into the stack to effect recovery of the entrained ammonium nitrate and to maintain a water level on the bubble cap plate sufficient to effect the desired reflux, the overflow from the bubble cap assembly 12 passing back into the neutralizer tank 1 through the overflow pipe 15 does not effect any substantial dilution of the product. The amount of water or other refluxing liquid used of course depends on the conditions of reaction in the neutralizer tank and therefore must be empirically determined for each specific process.

As nitric acid and ammonia gas continue to enter the neutralizer tank 1, the level of the solution rises in the tank until it reaches the top of the overflow standpipe 6. The upper level of the solution is now substantially neutralized and flows through standpipe 6 to the adjuster tank 8 where either additional ammonia gas or nitric acid is admitted until the desired alkalinity is reached. The solution is then led into surge tanks 9 where final checks are made prior to storage.

Having now described the general process of this invention in detail, the following example is given to specifically illustrate its high efficiency and commercial utility.

A battery of four neutralizer units equipped with stacks 17 feet in length and 30 inches in diameter had been in operation for some time. In placing these units in operation, 56.5% nitric acid was admitted in an amount sufficient to cover the spargers. Anhydrous ammonia was then admitted until the acid was substantially neutralized. 56.5% nitric acid and anhydrous ammonia were then fed simultaneously and continuously into the bottoms of the neutralizer tanks through spargers. The excess water furnished by the nitric acid was evaporated into the atmosphere by the heat of reaction. If this water were not evaporated, the concentration of the product would be lowered to about 62%. None of the stacks of these units had been equipped with refluxing assemblies in accordance with the present invention. It was found that the minimum loss of nitrogenous materials occurred when the liquor acidity was maintained at 0.11% to 0.20% free nitric acid. Analysis of the stack gases showed the presence of ammonium nitrate, nitric acid, ammonia and a small amount of nitrogen formed from the reaction between water, ammonium nitrate, and oxides of nitrogen entrained in the acid feed. Nitric acid was present in the greatest quantity with lesser amounts of ammonium nitrate, ammonium and nitrogen. When operating under ideal control, the total loss of nitrogenous materials into the atmosphere was found to be 0.5% of the total nitrogen input and thus represented an appreciable economic loss over long periods of operation.

The stacks of two of these four units were then equipped with means designed to effect a reflux of the stack gases and at the same time scrub them to remove entrained substances in accordance with the present invention. A bubble cap plate assembly was installed in each stack, the bottom of the plate being 2 feet above the bottom of the stack. This bubble cap assembly comprised one large bubble cap. A basket loaded with 3 inches of tumbled corrosion rings was lowered into the top of each stack by means of evenly spaced rods of equal length until the bottom of the basket was 4 feet below the top of the stack and the rods were then secured to the top of the stack by means of hooks. The bottoms of these baskets were perforated to allow free passage of the stack gases. The outside diameter of each basket was only slightly smaller than the inside diameter of the stack leaving only enough tolerance for the basket to slide into position. Water spray nozzles adapted to furnish a finely-divided spray directed to the stack walls and the ring basket were then centrally located above the ring baskets at a point 2 feet below the tops of the stacks.

The water sprays were turned on and the water was brought to a level of 6 inches in the bubble caps. Anhydrous ammonia gas and 56.5% nitric acid were then fed simultaneously and continuously through spargers into the neutralizer tanks which had been charged as before. The flow of water was varied until the minimum flow giving the maximum removal and recovery of nitrogenous materials and allowing for an ample safety factor, was determined. This flow amounted to about 10% by weight of the water vapor leaving the stack, or approximately 1 gallon per minute. All 4 units were then kept in continuous operation for 30 days with the same control being exercised over all 4 units with the exception of the reflux. At the end of that period it was found that the 2 units, the stacks of which were not equipped with the described refluxing assemblies, were still showing a loss of 0.5% of the total nitrogen input regardless of meticulous control. The 2 units equipped with the refluxing assemblies, under similar conditions of control, showed loss of only 0.03% of the nitrogen input. An analysis of the stack gases proceeding from the tops of the 2 stacks was made at regular intervals. Aside from almost imperceptible traces of ammonium nitrate, ammonia, and nitric acid, the stack gases were found to contain only water vapor, air and nitrogen formed from reaction of any oxides of nitrogen entrained in the acid feed. The resulting solution of ammonium nitrate from the units equipped with refluxing assemblies had a concentration of 83%, showing a negligible dilution of about 3% due to the reflux. The yield of nitrogen input as compared with nitrogen output was 99.97% of the theoretical yield, exclusive of losses due to the possible presence of oxides of nitrogen in the acid feed.

Although the amount of nitrogenous materials in the stack gases may be kept to a minimum by closely controlling the reaction conditions, upsets nevertheless frequently occur which greatly increase the losses. Despite meticulous care in starting a unit, it has also been found that losses are much greater at that time than under the normal reaction conditions. It is therefore desirable to maintain a reflux slightly in excess of that necessary to effect substantially complete removal of all nitrogenous materials under conditions of ideal control.

The design of the refluxing means within the neutralizer stack may vary. Instead of having two different components, that is, the bubble cap and ring basket as heretofore illustrated, the stack may be equipped with a single packed portion large enough, in conjunction with the water spray, to effect the desired reflux and scrubbing and to substantially remove all escaping nitrogenous materials or else may be equipped with a plurality of bubble cap assemblies designed to achieve the same result. However, the bubble cap-ring basket assembly is preferred because of its low cost and ease of installation in both new and old ammonium nitrate manufacturing units as well as because of its high efficiency. While the positions of bubble cap and ring basket will vary slightly with the specific conditions of reaction in the neutralizer tank, the bubble cap is usually near the bottom of the stack and the ring basket is usually in the upper half of the stack. This means that installation, repair, or replacement may be accomplished with relative ease.

In the preferred embodiment of the refluxing assembly, the bubble cap assembly has one large bubble cap, as shown in the drawing, but may have a plurality of small bubble caps. Since the single cap is a simpler construction and entirely adequate, it is preferred. The ring basket is preferably suspended from the top of the stack as in the example. However, it may be riveted or otherwise rigidly disposed at the desired point within the stack. In either event, the outside diameter of the ring basket should be only slightly less than the inside diameter of the stack so that the basket will just slide down the stack into place. The small amount of gas passing between the basket and stack wall is thoroughly scrubbed by the water trickling down along the stack wall and by the spray above. If the basket is rigidly fastened in place, a seal can be effected. However, any special seal has been found unnecessary. The bottom of the basket may be perforated in any suitable way as long as the ascending gas has free passage into the packing and the packing materials are retained. Although Raschig rings or corrosion rings are preferred, the packing material may consist of any of the suitable materials known to the art.

The spray nozzle is preferably of such a type and construction that it directs a finely-divided spray of the refluxing liquid against the stack walls and downward against the ring basket and its contents. While the preferred liquid for the spray is water, dilute nitric acid or a dilute aqueous solution of ammonium nitrate and nitric acid may also be employed. The operability of this latter solution makes it possible to cool and rechannel the reflux liquid if desired. A dilute aqueous ammoniacal solution is not preferred because the ammonia is so readily volatilized that a substantial portion will be lost.

As has been previously indicated, the amounts of the various nitrogenous substances lost through the neutralizer stacks vary with the particular conditions of reaction. If, therefore, losses are kept to a minimum by maintaining close control over these conditions of reaction, the amount of reflux necessary to effect removal and recovery of the vaporized and entrained nitrogenous substances may also be kept to a minimum.

The amount of reflux necessary to remove substantially all of the nitrogen-containing substances from the stack gases will of course vary with the degree of control exercised and with the conditions of reaction. In all cases it has been found that a 15% reflux of the stack gases, based on the amount of water in those gases, is entirely adequate and at the same time allows for ample safety factor in case of "upsets," and in putting the units in operation. Since a reflux of about 10% gives negligible dilution of the end product, it is preferred to use a 10% reflux and take advantage of an increased safety factor even though a lesser amount of reflux would be sufficient under ideal control.

Nitric acid of any desired strength may be employed in the production of ammonium nitrate in accordance with the invention. Since the process is particularly adapted to the manufacture of concentrated ammonium nitrate solutions, it is preferred to employ aqueous nitric acid having a concentration of from 55 to 60%. It is also possible to use any desired type of ammonia although anhydrous ammonia, and particularly anhydrous ammonia gas, is preferred. The temperature of the exothermic reaction will naturally vary with the strength and rate of feed of the reactants. A temperature of about 270° F. is encountered when 55–60% nitric acid and anhydrous ammonia are reacted.

As already mentioned, the positions of the components of the refluxing means within the neutralizer stack may vary. The relative positions of the various components given in the example are not intended to restrict the ambit of the claims since it is within the scope of the process of this invention to vary the location and type of the refluxing system within the neutralizer stack.

It is of course understood that all materials used in the apparatus disclosed should be acid-resistant.

There has, therefore, been disclosed a process for manufacture of ammonium nitrate wherein the loss of nitrogenous materials escaping with the neutralizer exhaust gases is substantially eliminated. Moreover, the process is simple, easily controlled and continuous while the necessary apparatus is easily and inexpensively installed in units already in operation as well as in new units. When the process of this invention is employed, the discomfort to personnel brought about by the mists emanating from the neutralizer stacks is removed as is the corrosion caused by the condensation of nitric acid on surrounding objects and the fire hazard existing because of continued deposition of ammonium nitrate. In addition, the economic saving through recovery of the escaping nitrogenous materials is substantial.

What we claim and desire to protect by Letters Patent is:

1. In the manufacture of concentrated solutions of ammonium nitrate, the method which comprises reacting ammonia and nitric acid at substantially atmospheric pressure in a reaction zone; passing the hot gases produced by the reaction and containing varying amounts of water vapor, nitric acid, ammonia, nitrogen, and entrained ammonium nitrate, to a superimposed exhaust zone vented to the atmosphere; subjecting the reaction gases to a limited condensation in the exhaust zone to form a condensate containing not more than 15% water based on the amount of water in the reaction gases; refluxing said condensate by gravity flow in the exhaust zone in intimate contact with and countercurrent to the ascending reaction gases to absorb substantially all escaping nitrogenous material from the reaction gases and to form a concentrated solution thereof; and withdrawing from the exhaust zone the concentrated solution of nitrogenous materials recovered from the reaction gases.

2. In the manufacture of concentrated solutions of ammonium nitrate, the method which comprises reacting ammonia and nitric acid at substantially atmospheric pressure in a reaction zone; passing the hot gases produced by the reaction and containing varying amounts of water vapor, nitric acid, ammonia, nitrogen, and entrained ammonium nitrate, to a superimposed exhaust zone vented to the atmosphere; subjecting the reaction gases to a limited condensation in the exhaust zone to form a condensate containing not more than 15% water based on the amount of water in the reaction gases; refluxing said condensate by gravity flow in the exhaust zone in intimate contact with and countercurrent to the ascending reaction gases to absorb substantially all escaping nitrogenous material from the reaction gases and to form a concentrated solution thereof; and leading said concentrated solution from the exhaust zone into the reaction zone.

3. A method in accordance with claim 2 in which water is sprayed into the exhaust zone to effect the limited condensation.

4. A method in accordance with claim 2 in which dilute nitric acid is sprayed into the exhaust zone to effect the limited condensation.

5. A method in accordance with claim 2 in which a dilute solution of nitric acid and ammonium nitrate is sprayed into the exhaust zone to effect the limited condensation.

6. A method in accordance with claim 2 in which 55-60% nitric acid is reacted with anhydrous ammonia.

7. A method in accordance with claim 2 in which 55-60% nitric acid is reacted with anhydrous ammonia and an excess of 0.1 to 0.5% nitric acid is maintained.

JOHN E. GREER.
ROBERT W. LAWRENCE.

REFERENCES CITED

The following references are of record in the file of this patent:

UNITED STATES PATENTS

| Number | Name | Date |
|---|---|---|
| Re. 21,217 | Fauser | Sept. 26, 1939 |
| 1,315,674 | Landis | Sept. 9, 1919 |
| 1,962,185 | Fauser | June 12, 1934 |
| 2,109,347 | Beekhuis | Feb. 22, 1938 |
| 2,167,464 | Rogers | July 25, 1939 |
| 2,434,899 | Biggs | Jan. 27, 1948 |

FOREIGN PATENTS

| Number | Country | Date |
|---|---|---|
| 703,771 | France | Feb. 10, 1931 |